(12) United States Patent
Giraldo

(10) Patent No.: US 11,000,803 B2
(45) Date of Patent: May 11, 2021

(54) SYSTEMS AND METHODS FOR CONCENTRATING A SUBSTANCE RECOVERED FROM A GAS STREAM

(71) Applicant: NUORGANICS LLC, Robbinsville, NJ (US)

(72) Inventor: Eugenio Giraldo, Robbinsville, NJ (US)

(73) Assignee: NUORGANICS LLC, Robbinsville, NJ (US)

( * ) Notice: Subject to any disclaimer, the term of this patent is extended or adjusted under 35 U.S.C. 154(b) by 271 days.

(21) Appl. No.: 16/247,768

(22) Filed: Jan. 15, 2019

(65) Prior Publication Data

US 2019/0217248 A1   Jul. 18, 2019

Related U.S. Application Data

(60) Provisional application No. 62/617,747, filed on Jan. 16, 2018.

(51) Int. Cl.
*B01D 53/78* (2006.01)
*B01D 53/79* (2006.01)
(Continued)

(52) U.S. Cl.
CPC ......... *B01D 53/78* (2013.01); *B01D 53/1418* (2013.01); *B01D 53/18* (2013.01);
(Continued)

(58) Field of Classification Search
CPC .......... B01D 2258/0266; B01D 1/0058; B01D 19/00; B01D 53/14; B01D 53/38;
(Continued)

(56) References Cited

U.S. PATENT DOCUMENTS

| 3,607,022 A | 9/1971 | Hausweiler et al. |
| 3,729,042 A * | 4/1973 | Burnett ................... C02F 11/18 |
| | | 159/2.1 |

(Continued)

FOREIGN PATENT DOCUMENTS

| BE | 731587 A | 10/1969 |
| CN | 107382015 A | 11/2017 |

(Continued)

OTHER PUBLICATIONS

Invitation to Pay Additional Fees in application No. PCT/US2019/013590 dated Mar. 12, 2019.

(Continued)

*Primary Examiner* — Timothy C Vanoy
(74) *Attorney, Agent, or Firm* — Lando & Anastasi, LLP

(57) ABSTRACT

Systems and methods of producing a concentrated solution from a gas stream are disclosed. The method of producing a concentrate solution includes introducing the gas stream having the contaminant into an absorption chamber, introducing a dilute liquid having the contaminant into the absorption chamber, at least one of the gas stream and the dilute liquid being at an elevated temperature, and contacting the gas stream with the dilute solution to produce a liquid-enriched gas stream and a concentrate solution. The systems for producing a concentrated solution include a source of a gas stream having a contaminant, a source of a dilute solution having the contaminant, and an absorption chamber fluidly connected to the source of the gas stream and the source of the dilute solution. The source of the dilute solution can have a subsystem for removing contaminants from the gas stream, constructed and arranged to receive the gas stream or a liquid-enriched gas and produce the dilute solution.

28 Claims, 8 Drawing Sheets

(51) Int. Cl.
*B01D 53/84* (2006.01)
*B01D 53/14* (2006.01)
*B01D 53/18* (2006.01)

(52) U.S. Cl.
CPC .............. *B01D 53/79* (2013.01); *B01D 53/84* (2013.01); *B01D 2252/103* (2013.01); *B01D 2257/406* (2013.01); *B01D 2258/0266* (2013.01); *B01D 2258/0283* (2013.01)

(58) Field of Classification Search
CPC .... B01D 53/58; B01D 53/78; B01D 2202/00; B01D 2257/406; C02F 1/00; C02F 1/02; C02F 1/20; C02F 2101/16; C02F 2103/20; C02F 2303/02; C02F 2307/08; A61L 9/00; A61L 9/14; A61L 9/145; A61L 2202/00; A61L 2202/10; A61L 2202/25; A61L 2209/10; A61L 2209/22; A62D 3/36; A01K 1/00; A01K 1/0047; A01K 31/00
See application file for complete search history.

(56) References Cited

U.S. PATENT DOCUMENTS

| | | | | |
|---|---|---|---|---|
| 4,405,354 A | * | 9/1983 | Thomas, II | ............... C05F 3/00 71/21 |
| 5,622,697 A | * | 4/1997 | Moore, Jr. | ........... A01K 1/0152 424/76.6 |
| 9,738,565 B2 | * | 8/2017 | Sanders | .................... C05F 3/00 |
| 9,993,770 B2 | * | 6/2018 | Andrews | ................ B01D 53/58 |
| 10,239,016 B2 | * | 3/2019 | Giraldo | .................. B01D 53/18 |
| 2007/0102352 A1 | * | 5/2007 | Burke | ....................... C05F 3/00 210/603 |
| 2012/0107209 A1 | * | 5/2012 | Vera-Castaneda | ...... C01B 17/60 423/242.2 |
| 2013/0315807 A1 | | 11/2013 | Vera-Castaneda | |
| 2015/0329399 A1 | * | 11/2015 | Kumar | .................... C01C 1/242 71/10 |
| 2016/0228594 A1 | * | 8/2016 | Carter | ....................... A61L 9/00 |
| 2017/0073261 A1 | * | 3/2017 | Josse | .................. B01D 19/0036 |
| 2017/0282094 A1 | * | 10/2017 | Wan | ......................... B01D 1/20 |
| 2018/0021690 A1 | * | 1/2018 | Stultz | ................... B01D 1/0058 202/185.1 |
| 2018/0354867 A1 | | 1/2018 | Giraldo et al. | |
| 2018/0154306 A1 | | 6/2018 | Giraldo et al. | |

FOREIGN PATENT DOCUMENTS

| | | | |
|---|---|---|---|
| DE | 1768216 A1 | 10/1971 | |
| DE | 1768216 B2 | 9/1976 | |
| FR | 2006308 A1 | 12/1969 | |
| GB | 1267692 A | 3/1972 | |
| JP | S4925560 B2 | 7/1974 | |
| NL | 6905798 A | 10/1969 | |
| NL | 163774 B | 5/1980 | |
| NL | 163774 C * | 10/1980 | ............... C01C 1/12 |

OTHER PUBLICATIONS

International Search Report and Written Opinion in application No. PCT/US2019/013590 dated May 9, 19.

* cited by examiner

SYSTEMS AND METHODS FOR CONCENTRATING A SUBSTANCE RECOVERED FROM A GAS STREAM

CROSS-REFERENCE TO RELATED APPLICATIONS

This application claims priority under 35 U.S.C. § 119(e) to U.S. Provisional Application Serial No. 62/617,747 titled "SYSTEMS AND METHODS FOR CONCENTRATING A SUBSTANCE RECOVERED FROM A GAS STREAM" filed on Jan. 16, 2018, which is herein incorporated by reference in its entirety for all purposes.

FIELD OF THE TECHNOLOGY

Aspects and embodiments disclosed herein relate to systems and methods for concentrating a substance recovered from a gas stream. In particular, systems and methods involve recovering a concentrated contaminant substance from a scrubbed gas stream.

SUMMARY

In accordance with an aspect, there is provided a method of producing a concentrate solution comprising a contaminant from a gas stream. The method may comprise introducing the gas stream comprising the contaminant into an absorption chamber. In some embodiments, the method may comprise introducing a dilute solution comprising the contaminant into the absorption chamber. At least one of the gas stream and the dilute solution may be at an elevated temperature. The method may further comprise contacting the gas stream with the dilute solution to produce a liquid-enriched gas, a concentrate solution, and water vapor. The method of producing a concentrate solution may comprise introducing the liquid-enriched gas into a scrubbing liquid to produce the dilute solution.

In accordance with certain embodiments, the elevated temperature of the gas stream or dilute liquid may be controlled to partially evaporate the dilute solution upon contact with the gas stream. The elevated temperature may be controlled to reach adiabatic saturation of the gas stream upon contact with the dilute solution. In some embodiments, the method comprises adding heat to the gas stream or to the dilute solution.

In some embodiments, the method of producing a concentrate solution may comprise collecting the concentrate solution. The concentrate solution may comprise at least one of nitrogen, sulfur, and carbon. The concentrate solution may be processed for further use.

The method may comprise drying organic material to produce the gas stream. In some embodiments, the gas stream is pretreated to remove solid particles.

In accordance with certain embodiments, the concentration of the contaminant in the concentrate solution may be controlled to a predetermined concentration. For example, the concentration of the contaminant may be controlled to induce formation of crystals. In other embodiments, the concentration of the contaminant may be controlled to avoid formation of crystals. The method may further comprise post-treating the concentrate solution to remove the crystals.

In some embodiments, the method of producing a concentrate solution may comprise introducing a non-water saturated gas into the gas stream.

In accordance with another aspect, there is provided a system for producing a concentrated solution from a gas stream. The system may comprise a source of a gas stream comprising a contaminant. The system may comprise a source of a dilute solution comprising the contaminant. In some embodiments, the system may comprise an absorption chamber fluidly connected to the source of the gas stream and the source of the dilute solution. The absorption chamber may have an outlet for a concentrated solution and an outlet for a liquid-enriched gas.

In some embodiments, the source of the dilute solution may comprise a subsystem for removing contaminants from the gas stream. The subsystem may be positioned downstream from the absorption chamber and constructed and arranged to receive at least one of the gas stream or the liquid-enriched gas and produce the dilute solution. The subsystem for removing contaminants from the gas stream may comprise a second absorption chamber having an inlet for the at least one of the gas stream or the liquid-enriched gas and having an outlet for the dilute solution.

The system for producing a concentrated solution may comprise a temperature control subsystem. The temperature control subsystem may be configured to maintain a predetermined temperature range within the absorption chamber. In some embodiments, the temperature control subsystem may comprise a temperature sensor. The temperature control subsystem may comprise a control module electrically connected to the temperature sensor and configured to adjust a temperature within the absorption chamber responsive to a measurement obtained by the temperature sensor. The temperature control subsystem may comprise a heat exchanger.

In accordance with certain embodiments, the subsystem for removing contaminants from the gas stream may comprise a pre-concentration unit positioned downstream from the second absorption chamber. The pre-concentration unit may comprise at least one of an ultrafiltration unit, a reverse osmosis unit, and an electrodialysis unit. In some embodiments, the pre-concentration unit may comprise at least two of an ultrafiltration unit, a reverse osmosis unit, and an electrodialysis unit.

The system for producing a concentrated solution may comprise a solids-liquid separation unit positioned downstream from the absorption chamber through the outlet for the concentrated solution. The solids-liquid separation unit may comprise at least one of a sedimentation unit and a filtration unit.

In some embodiments, the system may further comprise a gas-solids separation unit positioned downstream from the source of the gas stream. The gas-solids separation unit may comprise at least one of a cyclone unit and a bag filtration unit. The source of the gas stream may comprise an organic material dryer. The system may further comprise a source of a non-water saturated gas fluidly connected to the source of the gas stream.

In some embodiments, the subsystem for removing contaminants from the gas stream may further comprise a microbiological treatment subsystem fluidly connected to the second absorption chamber.

The subsystem for removing contaminants from the gas stream may further comprise a source of a base fluidly connected to the second absorption chamber.

In some embodiments, the subsystem for removing contaminants from the gas stream may further comprise a source of an oxidant fluidly connected to the second absorption chamber. The system for removing contaminants from the gas stream may further comprise a pH control subsystem configured to maintain a predetermined pH within the second absorption chamber. The system for removing contaminants from a gas stream may further comprise a conductivity control subsystem configured to maintain a predetermined conductivity within the second absorption chamber.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
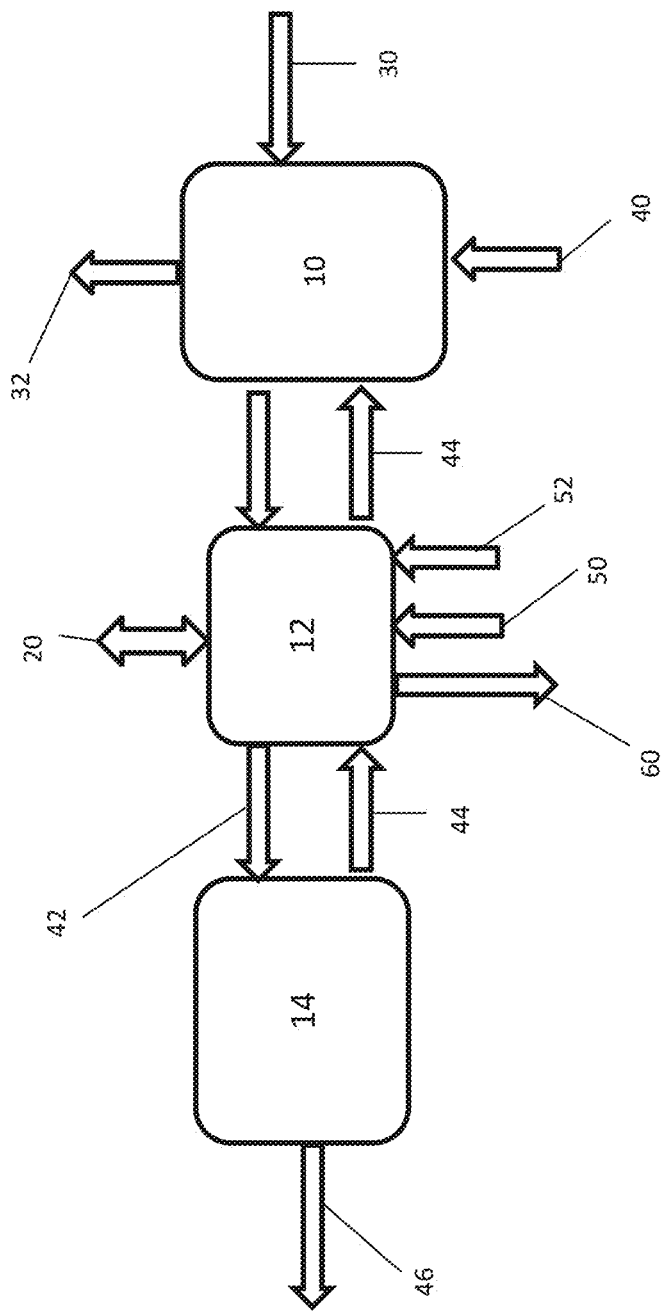
FIG. 1 is a box diagram of a system for removing contaminants from a gas stream, according to one embodiment.

Gas-liquid absorbers, such as scrubbers or sparging beds, are often used in the process of recovering a substance from a gas stream. For example, absorbers are employed to recover dust and various contaminants from process gas streams to produce a treated gas meeting environmental discharge requirements. Generally, a target contaminant present in the gas stream may be removed by contacting the gas with a scrubbing liquid. The contact may induce a transfer of the contaminant from the gas to the liquid. The treated gas may be released. In some applications, the liquid containing the target contaminant may be desirable as a commercial product. Thus, the liquid may be removed and further processed, if necessary, to form a liquid product.

The concentration of the target substance in the liquid may be carefully controlled for a number of reasons. In some embodiments, the concentration may be controlled due to a thermodynamic limitation for the absorption of the substance in the liquid. The concentration of the substance may be controlled to reduce inhibition of further reactions happening within the liquid, for example, when inhibition is concentration dependent. In yet other embodiments, concentration may be controlled in view of dilution of the substance in the liquid, due to simultaneous condensation of liquid vapors during the absorption of the target substance from the gas. As a result, the liquid product comprising the target substance may be dilute. A concentrated product comprising the substance is often desirable for commercial applications. Specifically, concentrating the liquid product may reduce excessive costs associated with storage and transport of dilute products. Liquid products are often concentrated, but the process may be expensive due to high capital and operational expenses.

Currently, liquid products are concentrated with complex processes such as reverse osmosis, electrodialysis or evaporation. Such processes generally require external energy to perform the concentration. Reverse osmosis and electrodialysis often face limitations in the degree of concentration that can be obtained due to osmotic effects. Thermal evaporative processes can further concentrate a liquid product beyond what reverse osmosis or electrodialysis are capable of concentrating, but the added costs of liquid evaporation are usually high and only employed for certain substances. A product with relatively low value is often not concentrated and either becomes a waste disposal problem or its use is limited to local markets due to storage and transportation costs. As disclosed herein, systems and methods employ an evaporative process for further concentrating a liquid product generated from recovery of a target substance from a gas stream. The methods and systems use the energy present in the gas stream to evaporate excess liquid from the dilute liquid product in a cost-effective manner.

In accordance with an aspect, there is provided a method of producing a concentrate solution comprising a contaminant from a gas stream. The method may comprise introducing the gas stream into an absorption chamber. The absorption chamber may be a liquid-gas absorption or reaction chamber. The gas stream may comprise one or more contaminants. In some embodiments, the gas stream may be introduced at an elevated temperature. The method may further comprise introducing a dilute solution comprising the contaminants from the gas stream into the absorption chamber, where the gas stream and dilute solution are contacted. In some embodiments, the dilute liquid may be introduced at an elevated temperature. The contact may result in the production of a liquid-enriched gas, a concentrate solution, and water vapor. Generally, the dilute solution may have a lower concentration of the contaminant than the concentrate solution, and the liquid-enriched gas may have a lower concentration of the contaminant than the incoming gas stream. The liquid-enriched gas may additionally have a lower concentration of volatile organic carbon than the gas stream.

In some embodiments, methods may comprise introducing the liquid-enriched gas into a scrubbing liquid to produce the dilute solution. The dilute solution may also be produced by introducing the gas stream into a scrubbing liquid. The gas stream with the target substance to be recovered may be put in contact with the liquid product that is generated in a substance recovery process. The gas may be cooled down by evaporating a fraction of the liquid in the dilute solution, using the gas stream sensible heat. The solution becomes more concentrated and the process is generally repeated until the liquid product reaches a desired concentration, at which point it may be removed as a concentrated liquid product.

The gas stream, after contacting the dilute liquid, is generally enriched in liquid and it conveyed to the substance recovery process, where the target contaminant is removed, forming the dilute liquid product. Such dilute liquid product may be transferred upstream to be contacted with incoming gas from the gas stream and concentrated, as previously described. By using the sensible heat in the incoming gas, the main costs associated with an evaporative concentration process can be minimized.

Systems and methods disclosed herein may employ temperature control mechanisms. In accordance with certain embodiments, the method may comprise controlling a temperature of one or more of the input gas, a process liquid, (for example, a dilute liquid or pre-concentrated liquid), or the liquid-enriched gas. The elevated temperature of the gas stream may be controlled to partially evaporate the dilute solution upon contact with the gas stream. In some embodiments, the dilute liquid may be introduced at an elevated temperature to heat the gas during evaporation. Water vapor may be evaporated from the dilute solution to produce the concentrate solution. Additionally, water vapor may be evaporated from the dilute solution to increase the relative humidity of the gas stream, producing the liquid-enriched gas.

The elevated temperature of the gas stream or dilute liquid may be controlled to reach adiabatic saturation of the gas stream upon contact with the dilute solution. Thus, the controlled temperature will generally depend on the composition of the gas stream and/or the composition of the dilute solution. In some embodiments, the temperature may be controlled to about 230° F. The amount of heat available for evaporation of liquid product may be maximized when the input gas has reached adiabatic saturation. No further cooling of the input gas can be achieved once adiabatic saturation is reached. In some embodiments, for example, when the incoming gas has high relative humidity and the liquid product is dilute, there may be a need to supplement the heat from the input gas by adding external heat to the liquid product or the input gas. In accordance with some embodiments, additional heat to the one present in the input gas may be required to concentrate the liquid product and may be provided, for example, by a heat exchanger.

Where the gas stream has an elevated temperature, the temperature of the gas stream will generally be dependent on the method used to produce the gas stream. In some embodiments, organic material may be dried to produce the gas stream. Organic material, for example, moist manure, may be introduced into a dryer. The organic material may be dried, evaporating moisture and ammonia from the manure and producing an ammonia gas stream. The gas stream may be rich in moisture and ammonia. In some embodiments, heat applied during drying may sterilize infectious agents in the organic material.

The organic material may comprise, for example, poultry manure or poultry litter. In some embodiments, the poultry manure or poultry litter may comprise chicken manure or chicken litter. Poultry may generally refer to domestic fowl. In some embodiments, poultry may comprise wild game birds. Poultry manure or litter may comprise chicken, turkey, goose, duck, swan, quail, ostrich, or pigeon manure or litter, and combinations thereof. The organic material may comprise animal manure or litter, for example, of any domesticated or farm animal. The organic material may additionally or alternatively comprise sewage sludge. In some embodiments, the organic material may additionally or alternatively comprise food waste, for example, produce waste. Methods disclosed herein may comprise collecting manure, litter, sewage sludge, or food waste. Methods may comprise processing manure, litter, sewage sludge, or food waste to produce an organic material.

In some embodiments, methods may comprise removing heat from one or more process components. High temperatures may affect the dissolution of gases in liquids. Any one or more of the following mechanisms may be employed to control temperature. In accordance with certain embodiments, water may be evaporated using the latent heat of vaporization of water and removal of water vapors along the rest of treated gases. In some embodiments, active heat exchange may be employed for removal of heat from hot input gases or to increase heat and vaporization of process liquids. In some embodiments, active heat exchange may be employed directly from absorption and/or reaction chambers. Active or passive heat exchange may be employed to transfer heat between various components of a system, for example, between an absorption chamber and an organic material dryer.

Methods may comprise adding or removing heat from the gas stream or the dilute solution. In some embodiments, methods may comprise transferring heat between the gas and the dilute solution to control the temperature or partially evaporate liquid from the dilute solution. For example, the temperature may be controlled between about 85° F. and about 350° F. The temperature may be controlled to between about 100° F. and about 300° F., between about 150° F. and about 280° F., or between about 180° F. and about 250° F.

In some embodiments, the method of producing a concentrate solution may comprise collecting the concentrate solution. The composition of the concentrate solution may generally be dependent on the composition of the dilute solution and gas stream. In some embodiments, where the liquid-enriched gas is scrubbed to produce the dilute solution, the composition of the concentrate solution will generally be dependent on the composition of the gas stream. Scrubbed gases typically comprise controlled contaminants that must be captured from polluting gases. The gas stream may comprise a contaminant that is scrubbed from the gas stream. For example, the gas stream may comprise a contaminant selected from nitrogen, sulfur, and carbon. In such embodiments, the concentrate solution may comprise at least one of nitrogen, sulfur, and carbon. The concentrate solution may be processed for further use.

In accordance with one or more of the embodiments simultaneously with the evaporative concentration process previously described dust particles present in the input gas stream may also be captured and incorporated into the liquid product. These dust particles may be easily removed once in the liquid with a solid-liquid separation process. The method may further comprise post-treating the concentrate solution to remove solid particles. Solid particles may be removed, for example, by a sedimentation or filtration process. The ionic strength of the liquid product generally increases with an increasing concentration process, and the dust particles tend to coagulate in a liquid of high ionic strength, further easing the removal of solid particles from the liquid product.

In accordance with certain embodiments, the concentration of the contaminant in the concentrate solution may be controlled to a predetermined concentration. For example, the concentration of the contaminant may be controlled to induce formation of crystals. The composition of the crystals may generally depend on the composition of the dilute solution and the gas stream. The method may further comprise post-treating the concentrate solution to remove the crystals. In some embodiments, the crystals are treated for further use, for example, for use a solid fertilizer product.

In other embodiments, the concentration of the contaminant may be controlled to avoid formation of crystals. Avoiding formation of crystals may provide a desired composition of concentrate solution. The concentrate solution may be treated for further use, for example, for use as a liquid fertilizer product. In embodiments wherein the gas stream is produced by drying organic material, the fertilizer product may be a certified product suitable for organic farming.

The method may comprise drying organic material to produce the gas stream. Heat applied during drying may sterilize infectious agents in the organic material. However, non-live contaminants may be released into the gas stream, for example, the gas stream may comprise solid particles such as dust and other volatiles. In some embodiments, the gas stream is pretreated to remove contaminants. The contaminants, for example, solids, may be separated from the gas stream. In some embodiments, the contaminants are separated from the gas stream and discarded. Such methods may minimize the incorporation of solid particles to the liquid.

In some embodiments, the method of producing a concentrate solution may comprise introducing a non-water saturated gas into the gas stream. The non-water saturated gas may be employed to further enhance the evaporation of the dilute solution.

The method of producing a concentrate solution may comprise pre-concentrating the dilute solution after producing it with a scrubbing liquid. The dilute solution may be pre-concentrated, for example, by one or more of a reverse osmosis, electrodialysis, or ultrafiltration process. The solution may be introduced into the absorption chamber as a pre-concentrated solution to contact the gas stream therein.

In accordance with another aspect, there is provided a system for producing a concentrated solution from a gas stream. The system may comprise a source of a gas stream comprising a contaminant. In some embodiments, the source of the gas stream may be a processing plant which produces a contaminant gas as a byproduct. The source of a gas stream may be a plant which typically employs a scrubbing or other system to remove contaminants from a gas byproduct. The source of a gas stream may be an organic material dryer, as previously described.

The system may comprise a source of a dilute solution comprising the contaminant. In some embodiments, the system may comprise an absorption chamber fluidly connectable to the source of the gas stream and the source of the dilute solution. It is to be understood that the absorption chamber may be fluidly connected to the source of the gas stream and the source of the dilute solution during operation. The absorption chamber may have an outlet for a concentrated solution and an outlet for a liquid-enriched gas. The absorption chamber may be constructed and arranged to combine the gas stream and dilute solution. In some embodiments, the absorption chamber may have an inlet for dilution water. The system may comprise more than one absorption chamber, wherein gases and liquids are transferred between the one or more absorption chambers.

In some embodiments, the absorption chamber may comprise a gas-liquid contactor. The gas-liquid contactor may introduce a gas into a liquid (for example, the gas stream into the dilute solution) by dispersing the gas with a fine mist of solution or by flowing the gas though a volume of solution. The gas-liquid contactor may be a differential gas-liquid contactor or a stagewise gas-liquid contactor. The absorption chamber may comprise one or more of a gas sparger, a gas-liquid column (for example, a falling-film column, a packed column, a bubble column, or a plate column), a spray tower, an agitated vessel, a scrubber, a rotating disc contactor, a Venturi tube, a dispersion tube, or any other vessel configured to contact a gas and a liquid. The absorption chamber may comprise at least one of an enriched gas outlet and a product outlet. The reaction subsystem may further comprise at least one of a gas inlet and a liquid inlet.

The system may comprise a wet electrostatic precipitator positioned within an absorption chamber. The wet electrostatic precipitator may be employed to prevent precipitation and/or aerosolization of product gas within the absorption chamber. The prevention of precipitation and/or aerosolization may limit and/or control unwanted byproducts from exiting the system. In some embodiments, the wet electrostatic precipitator may improve a yield of a target substance in the product by controlling undesired precipitation and/or aerosolization of the product.

The system for producing a concentrated liquid contaminant product may comprise a temperature control subsystem. The temperature control subsystem may be configured to maintain a predetermined temperature range within the absorption chamber. The temperature control subsystem may employ active or passive heat transfer. In some embodiments, the temperature control subsystem comprises a chiller or a heater. The temperature control subsystem may further be configured to provide heat to the system for removing contaminants from a gas stream, for example, to produce input gases. The temperature control subsystem may be configured to heat or cool the gas stream or input liquid stream, as required. The temperature control subsystem may comprise a heat exchanger constructed and arranged to transfer heat between components and subsystems of the system. The heat exchanger may employ mechanisms to diffuse heat within the system, for example, to conserve heat energy. The heat exchanger may employ mechanisms to provide heat to the input gas or absorption chamber.

In some embodiments, the temperature control subsystem may comprise a temperature sensor. One or more setting may be adjusted manually or automatically upon measuring a temperature outside the predetermined temperature range. The temperature control subsystem may comprise a control module electrically connected to the temperature sensor. In some embodiments, the control module may be configured to adjust a temperature within the absorption chamber, for example, manually or automatically, responsive to a measurement obtained by the temperature sensor. The temperature control subsystem may be configured to maintain a predetermined temperature range. The temperature control subsystem may comprise a heat exchanger.

The system for producing a concentrated solution may comprise a solids-liquid separation unit positioned downstream from the absorption chamber through the outlet for the concentrated solution. The solids-liquid separation unit may be employed to separate solid pollutants, for example, undesired crystals, solids formed from dust particle flocs, or biological flocs. The solids-liquid separation unit may further be employed to collect desired crystal product. The solids-liquid separation unit may comprise at least one of a sedimentation unit and a filtration unit to process the concentrated product for further use.

In some embodiments, the system may further comprise a gas-solids separation unit positioned downstream from the source of the gas stream. The solids-gas separator may comprise, for example, an air filter or a multicyclone separator. The solids-gas separator may be configured to remove dust and other contaminants from one or more gas streams within the system. Any waste collected through the solids waste outlet of the separator may be discarded. The source of the gas stream may comprise an organic material dryer, as previously described.

In some embodiments, the system may further comprise a source of a non-water saturated gas fluidly connected to the source of the gas stream. The non-water saturated gas may be employed to further enhance the evaporation of the dilute solution.

In some embodiments, the source of the dilute solution may comprise a subsystem for removing contaminants from the gas stream. The subsystem may be positioned downstream from the absorption chamber and constructed and arranged to receive at least one of the gas stream or the liquid-enriched gas and contact the gas with a scrubbing liquid. The scrubbing liquid may absorb contaminants from the gas and produce the dilute solution. Treated gas may be released, as will be apparent to one of ordinary skill in the art.

In some embodiments, the subsystem for removing contaminants from the gas stream may comprise a second absorption chamber having an inlet for the at least one of the gas stream or the liquid-enriched gas and having an outlet for the dilute solution. The absorption chamber may be a gas-liquid contactor, as previously described.

In accordance with certain embodiments, the subsystem for removing contaminants from the gas stream may comprise a pre-concentration unit positioned downstream from the second absorption chamber. The pre-concentration unit may comprise at least one of an ultrafiltration unit, a reverse osmosis unit, and an electrodialysis unit. In some embodiments, the pre-concentration unit may comprise at least two of an ultrafiltration unit, a reverse osmosis unit, and an electrodialysis unit. The pre-concentration unit may be configured to pre-concentrate dilute solution before it is conveyed to the absorption chamber for contact with the gas stream.

In some embodiments, the subsystem for removing contaminants from the gas stream may further comprise a microbiological treatment subsystem fluidly connected to the second absorption chamber. The microbiological treatment subsystem may be positioned downstream from the absorption chamber, such that the gas that contacts the microorganisms is the liquid-enriched gas. The liquid-enriched gas may be safer for the microorganisms, since it comprises a dilute concentration of contaminants, as compared to the input gas stream.

Systems and methods may comprise dosing the one or more process liquids with a biological catalyst. In accordance with certain embodiments, a naturally occurring microbial culture may be employed to enhance treatment of the product gas. Process liquids may be dosed with biological catalyst, for example a microbial or enzymatic organism. Catalysis may be accomplished by retaining the biological organisms catalyzing the oxidation in the reaction tank where oxygen is supplied. Once the organisms grow and are established in the system, they may be separated out of the final liquid and/or solid product. In accordance with certain embodiments, the separated biological organisms may be returned back to the reaction tank to enhance the culture, further speeding the treatment reaction.

In some embodiments, the system may further comprise a source of an oxidant. The source of an oxidant may be fluidly connected to an absorption chamber, for example, to the second absorption chamber within the subsystem for removing contaminants from the gas stream.

The system may comprise an oxidation control subsystem. The oxidation control subsystem may be configured to maintain a predetermined oxidation reduction potential (ORP) within the components or subsystems of the system, for example, within the second absorption chamber. In some embodiments, the oxidation control subsystem may comprise an ORP sensor configured to measure ORP of a solution within the system. One or more setting may be adjusted manually or automatically upon measuring an ORP that requires adjustment. The system may further comprise a control module electrically connected to the ORP sensor. The control module may be configured to adjust the ORP within the system, for example, manually or automatically, responsive to a measurement obtained by the ORP sensor. The control module may be configured to provide more or less oxidant to the system, to adjust the ORP therein.

In some embodiments, the system may further comprise a source of a base. The source of a base may be fluidly connected to an absorption chamber, for example, to the second absorption chamber within the subsystem for removing contaminants from the gas stream.

The system may further comprise a pH control subsystem configured to maintain a predetermined pH within the components or subsystems of the system, for example, within the second absorption chamber. The pH control subsystem may comprise a pH meter configured to measure pH of a solution within a component or subsystem of the system. One or more setting may be adjusted manually or automatically upon measuring a pH that requires an adjustment. The system may comprise a control module electrically connected to the pH meter. The control module may be configured to adjust pH within the subsystem, for example, manually or automatically, responsive to a measurement obtained by the pH meter. The pH may be adjusted as required by addition of an acid or a base, by adjusting a concentration of oxidant within the system (for example, increasing or decreasing aeration), or by dilution or evaporation of a solution within the system. The control module may be configured to adjust pH to a predetermined value.

The pH control subsystem may be configured to maintain a pH that is favorable to the microbiological treatment subsystem. In some embodiments, the pH control subsystem is configured to maintain a pH between about 2 and about 9. The subsystem may be configured to maintain a pH between about 5 and about 8.5 or between about 6 and about 7.5. The subsystem may be configured to maintain a pH between about 6.7 and about 8.1, for example, where the system comprises a microbiological treatment subsystem.

The system may further comprise a conductivity control subsystem configured to maintain a predetermined conductivity within a component or subsystem of the system, for example, within the second absorption chamber. In some embodiments, the conductivity control subsystem may comprise a conductivity meter. The conductivity meter may be configured to measure conductivity of a gas or solution within a component or subsystem of the system. One or more setting may be adjusted manually or automatically upon measuring a conductivity that requires adjustment. The system may comprise a control module electrically connected to the conductivity meter. The control module may be configured to adjust the conductivity of the gas or the solution within the system, for example manually or automatically, responsive to a measurement obtained by the conductivity meter. In some embodiments, the control module may adjust conductivity by adjusting one or more of pH, temperature, concentration of ions, or concentration of an oxidant in the system.

In accordance with certain embodiments, the control module may be configured to maintain a predetermined concentration of a contaminant in the process liquids, for example, a predetermined concentration of TDS in the solution within the system. The predetermined concentration of the contaminant may be selected to induce formation of crystals. In other embodiments, the predetermined concentration of contaminant may be selected to avoid formation of crystals. The control module may adjust a concentration of a substance or TDS within the system by adjusting one or more of pH, temperature, concentration of ions, or concentration of an oxidant in the system.

As shown in the exemplary embodiment of FIG. 1 an inlet gas 30 with a target substance to be recovered may be introduced into an absorption chamber 10 where such target substance may be transferred into an absorbing liquid. The treated gas 32 with a fraction of the target substance removed may be conveyed out of such absorption chamber 10. The absorption chamber 10 may be connected to a reaction chamber 12. The absorbing liquid 42, 44 may be actively exchanged back and forth between the absorption chamber 10 and reaction chamber 12. In the reaction chamber 12 the conditions of the liquid may be adjusted with a variety of means in order to condition such liquid to continue absorbing the target substance in the absorption chamber 10. In some embodiments, the pH of the liquid solution may be controlled, a base 52 may be added, or an oxidant 50 may be added to partially or fully oxidize the target compound. Heat 20 may be added or removed from the reaction chamber 12 to control temperature and dilution water may be added to control the concentration of the substances in the reaction chamber to optimize reaction conditions. A liquid product 46 may be removed from the reaction chamber as a final product, yet in some embodiments such liquid product may be conveyed to a dissolved solids concentrator in order to remove excess water and have a more concentrated final product. A reverse osmosis or electrodialysis unit is typically used in the dissolved solids concentrator but other technologies are possible. Some of the water 60 removed from the liquid product in the dissolved solids concentrator may be returned to the reaction chamber in order to control the concentration as previously described. In other embodiments a fraction or all of the water 60 may be discarded as wastewater. The water 60 may contain solids. The concentrated product may be conveyed away from the dissolved solids concentrator.

Figure 2:
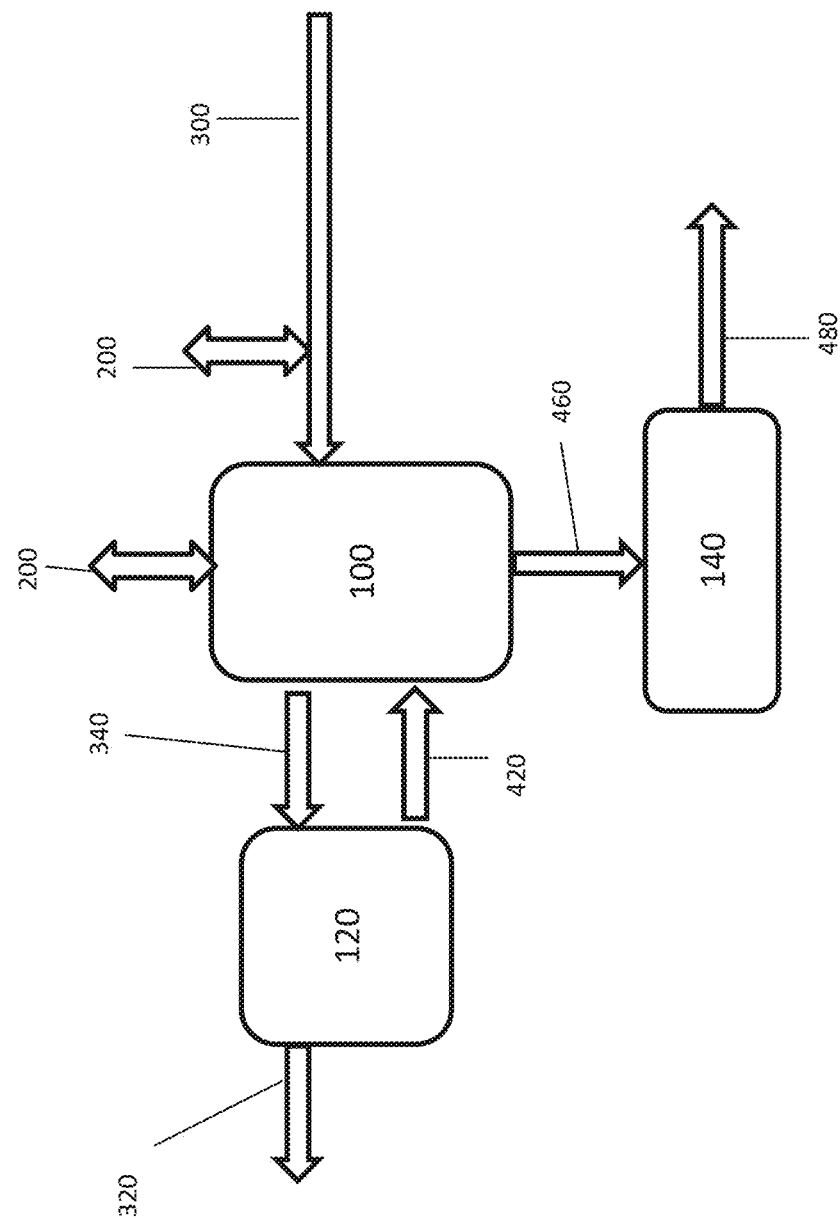
FIG. 2 is a box diagram of a system for concentrating a substance recovered from a gas stream.

In the exemplary embodiment of FIG. 2 the inlet gas 30 with the substance to be recovered may be put in contact with the liquid product 420 coming from a downstream substance recovery process using a gas liquid absorption chamber 100. The sensible heat 200 in the inlet gas 300 may be used to induce evaporation of the liquid product 420, further concentrating such product. The inlet gas 300 may be enriched with liquid from the liquid product 420, and such liquid enriched gas 340 may be conveyed to the downstream substance recovery process 120. In the downstream substance recovery process 120 the target substance may be transferred from the liquid enriched gas 340 into the liquid product 320. The recovered substance might undergo one or more reactions in the substance recovery process 120 to form a dilute liquid product 420 while in yet other embodiments no reactions occur. The dilute liquid product 420 may be conveyed back into the gas liquid contact chamber 100 for further concentrating. In some embodiments, heat 200 may be added to the inlet gas 300 or to the liquid in the gas-liquid absorption chamber 100. Heat exchangers or other devices to transfer heat may be employed. In some embodiments the concentrated liquid product 460 obtained from the gas-liquid absorption chamber 100 is the final product, while in yet other embodiments the concentrated liquid product 460 may be further treated to remove dust particles that were collected in the liquid from the inlet gas 30. A liquid-solid particle removal process 140, such as but not limited to a settling chamber or a filter, may be used. The treated concentrated liquid 480 with a fraction of the particles removed may be conveyed away as final product.

Figure 3:
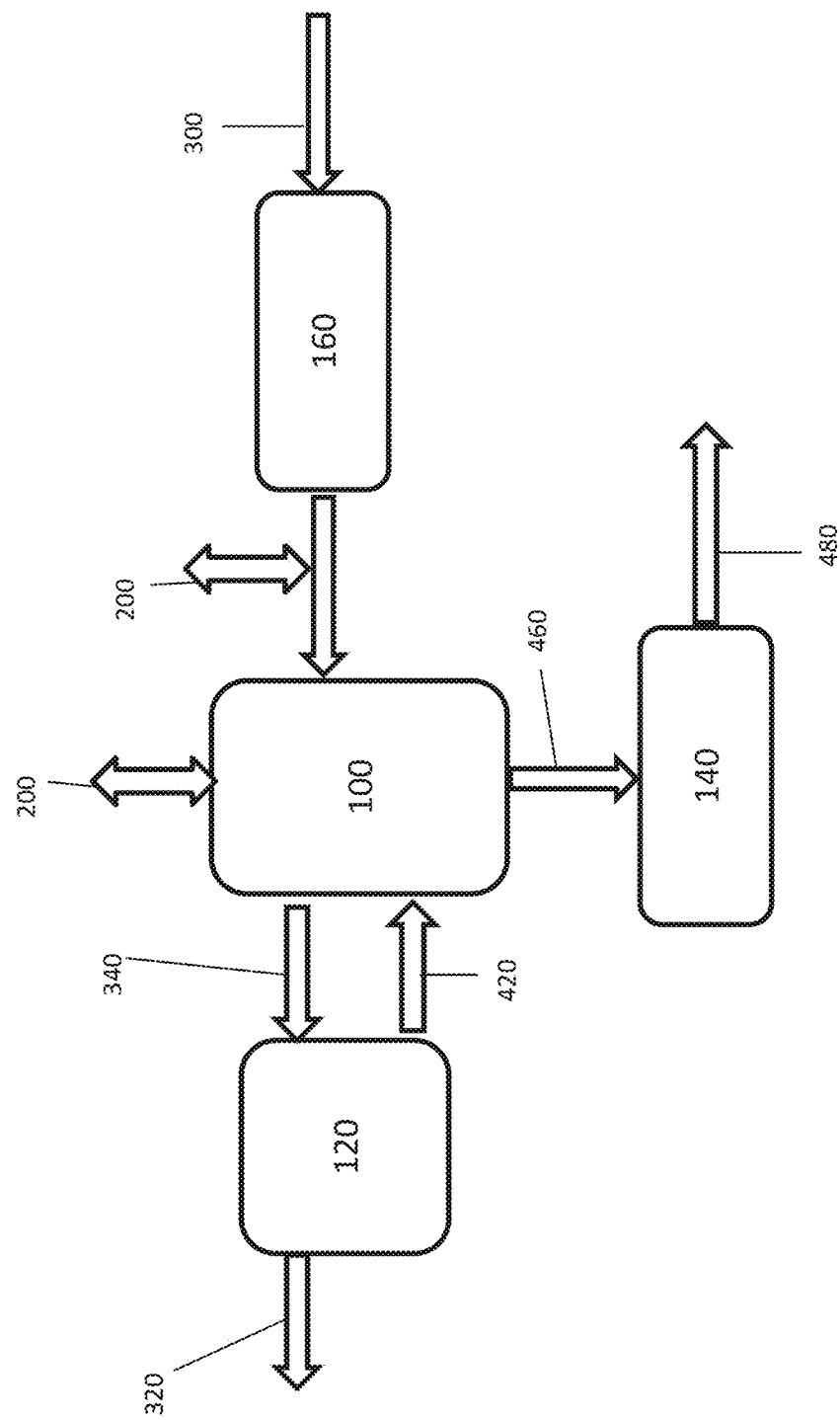
FIG. 3 is a box diagram of an alternate embodiment of a system for concentrating a substance recovered from a gas stream.
Figure 4:
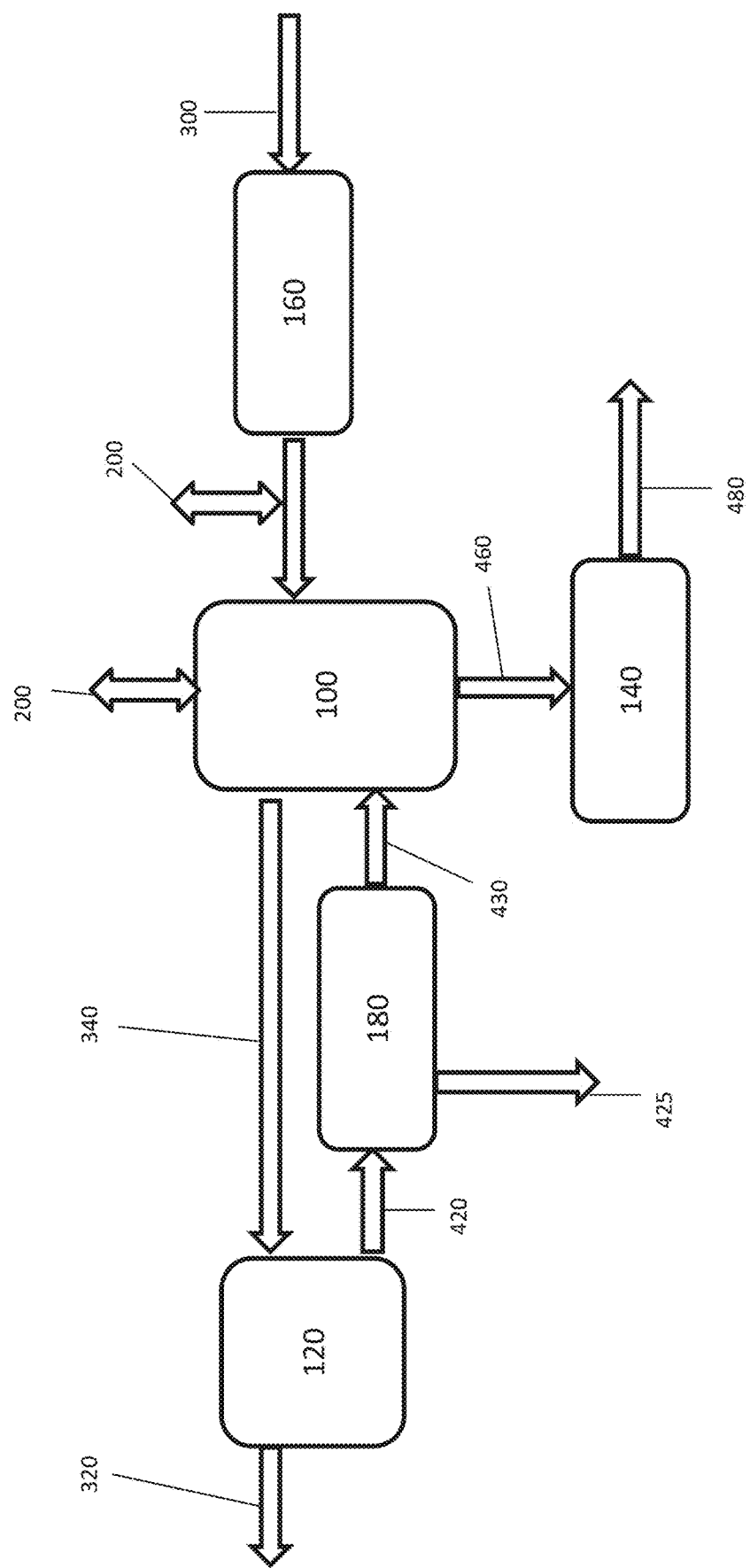
FIG. 4 is a box diagram of an alternate embodiment of a system for concentrating a substance recovered from a gas stream.

The exemplary embodiment of FIG. 3 includes a pretreatment process 160 of the inlet gas 30 prior to introduction to the gas-liquid absorption chamber 100. The pretreatment 160 may be employed to remove a fraction of the dust particles present in the gas 30, for example, by using a gas-solid particle removal process, such as a bag filter or a cyclone. The exemplary embodiment of FIG. 4 includes a pre-concentration process 180 of the dilute liquid product 420 downstream from the substance recovery process 120. The dilute liquid product 420 may be pre-concentrated to produce a pre-concentrated liquid 430 in a dissolved solids concentrator, for example a reverse osmosis or electrodialysis unit, prior to introducing it into a gas-liquid absorption chamber 100. The excess liquid 425 removed from the dilute liquid product 420 may be returned to the substance recovery process 120 as a diluent or discarded as waste.

Figure 5:
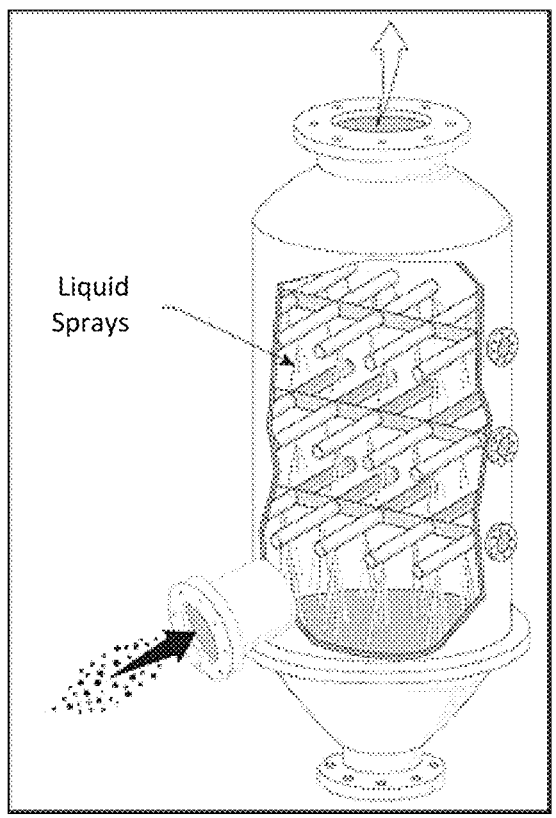
FIG. 5 is a schematic diagram of an absorption chamber, according to one embodiment.
Figure 6:
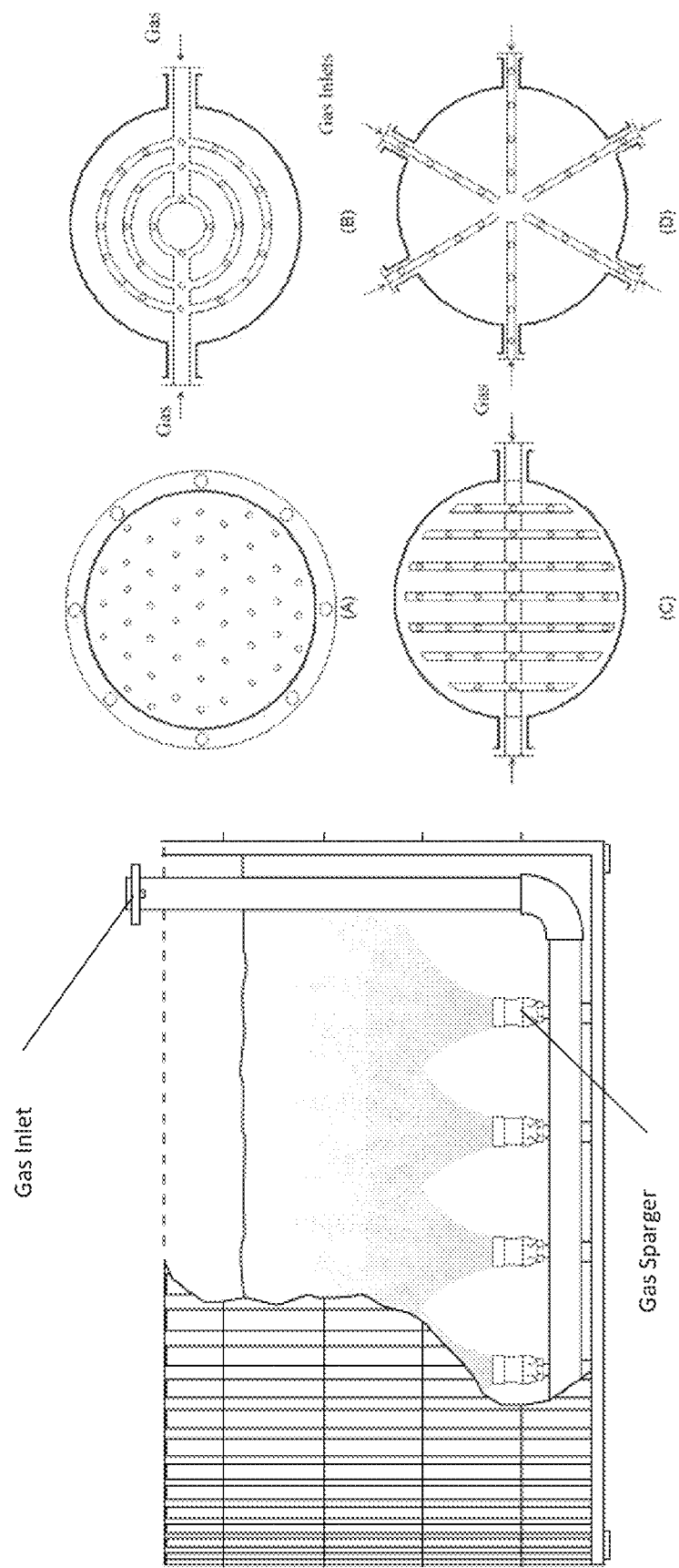
FIG. 6 is a schematic diagram of an absorption chamber, according to another embodiment.

FIG. 5 is an illustration of an exemplary spray tower that may be used as a gas-liquid absorption or contact chamber. In the exemplary spray tower, a larger liquid surface area is created by the spray nozzles to induce evaporation of the liquid into the gas. Many alternative designs of gas-liquid absorption or contact chambers may be employed, as will be evident to someone skilled in the art. FIG. 6 is an illustration of an alternative exemplary gas-liquid absorption or contact chamber, where the gas is sparged into a pool of liquid using alternative sparger designs. The exemplary sparger forms a swarm of bubbles with a high surface area to induce gas to liquid heat transfer.

Figure 7:
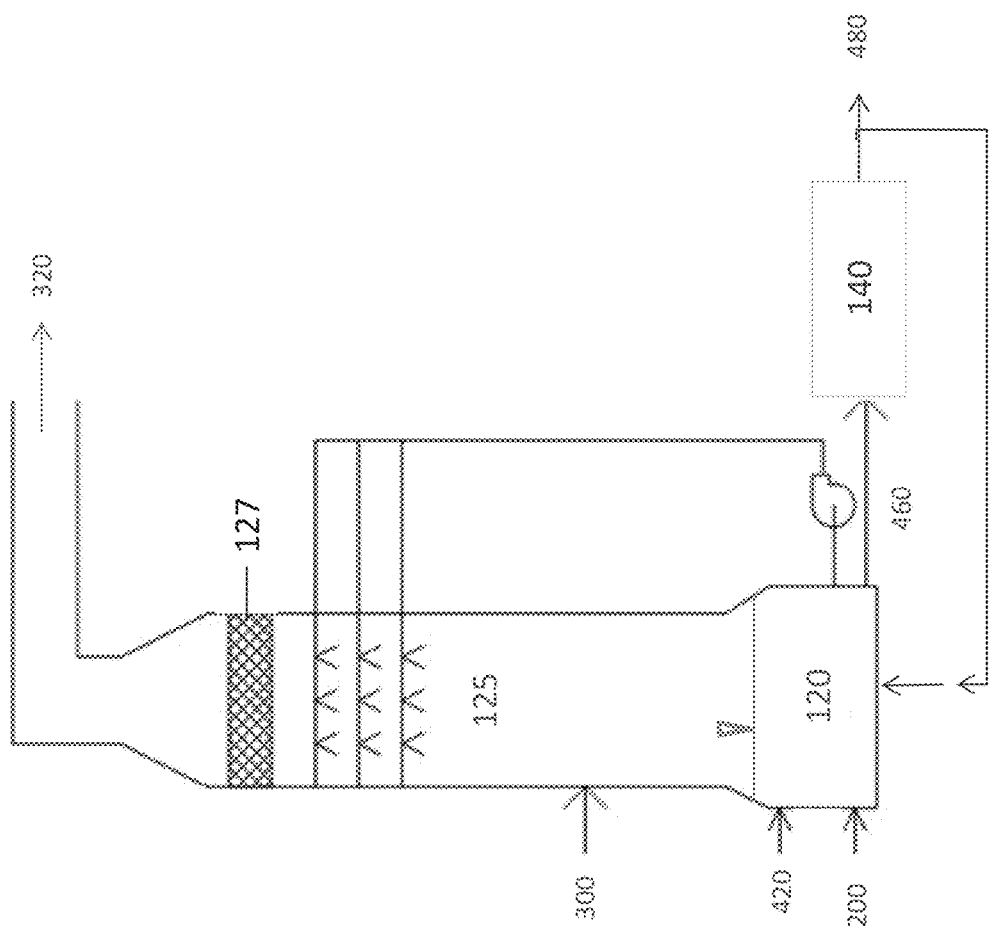
FIG. 7 is a schematic diagram of an absorption chamber, according to yet another embodiment.

FIG. 7 is an illustration of yet another embodiment of an exemplary gas-liquid absorption or contact chamber. The exemplary scrubber tower of FIG. 7 includes alternative chamber locations 125, 120 within the scrubber for obtaining the concentration of the liquid product 460. The inlet gas 300 with the substance to be removed is introduced in the scrubber 125 and put in contact with a shower of liquid 200 to induce the heat transfer and evaporation of the liquid. In some embodiments, heat 200 may be added. The cooled and liquid enriched gas passes a mist eliminator 127 to retain small droplets of product. In some embodiments the concentrated product 460 in the scrubber sump 120 may be part of a liquid flow loop where a solid liquid separation process 140 is employed to retain dust particles and control the concentration of suspended solids in the scrubbing liquid. A fraction of the recirculation flow 480 may be removed away as concentrated final product.

Figure 8:
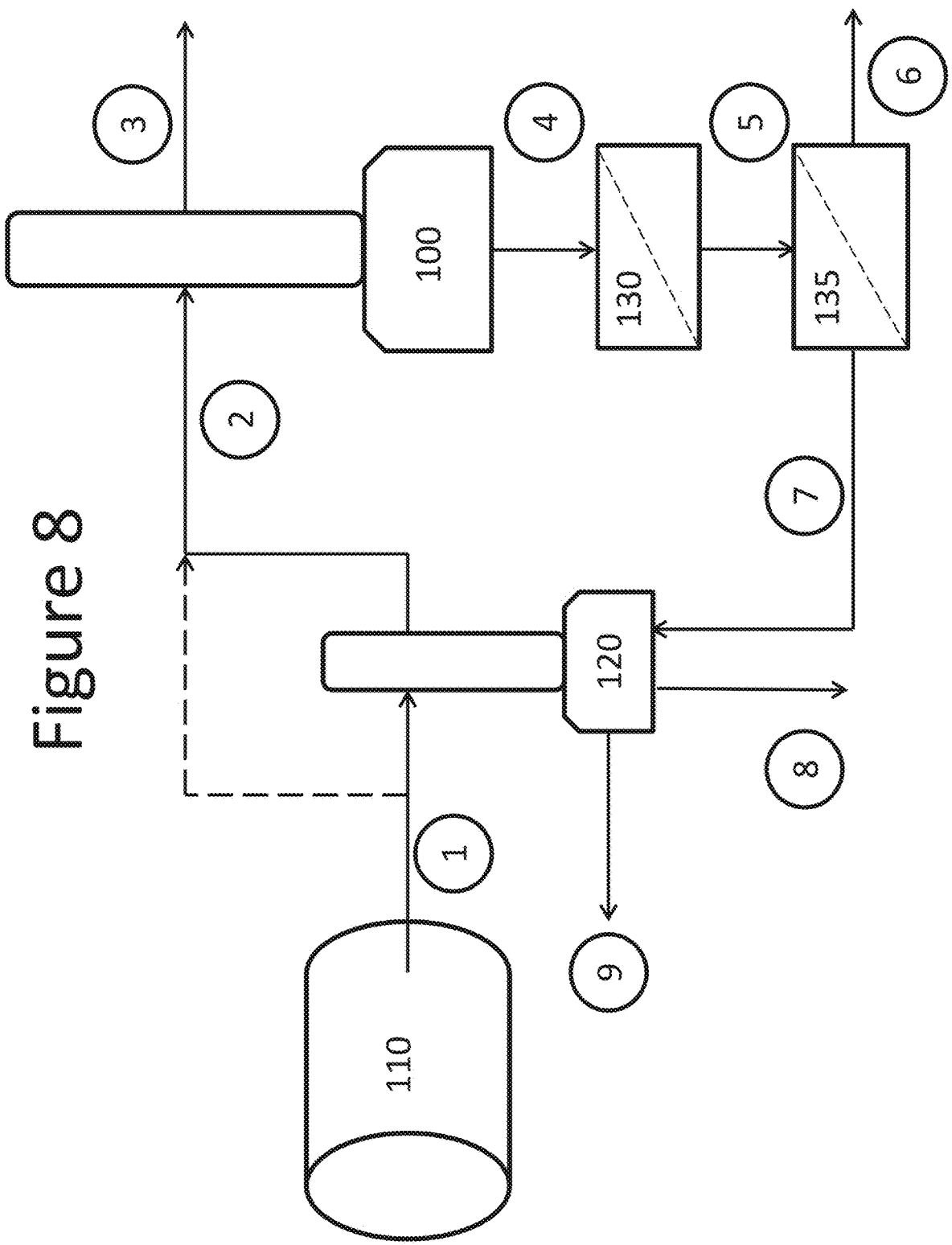
FIG. 8 is a schematic diagram of a system for concentrating a substance recovered from a gas stream, according to one embodiment.

Systems and methods disclosed herein may be run according to the exemplary embodiment shown in FIG. 8. At start up, flue gases from a source of a gas to be treated 110 may be put in contact with a scrubbing liquid in an absorption chamber 100. The absorption chamber 100 may produce a treated gas and a liquid comprising contaminants from the flue gas. The liquid may be introduced into an ultrafiltration unit 130 and the effluent into a reverse osmosis unit 135, to produce a pre-concentrated liquid product. Treated liquid may be discharged from the reverse osmosis unit as diluent, while the concentrated retentate may be introduced into a second absorption chamber 120. In the second absorption chamber 120, the flue gas from the source of a gas 110 may be scrubbed with the retentate. The hot flue gas may be cooled by the retentate while simultaneously evaporating water from the retentate, producing a concentrated liquid product. The concentrated liquid product may be discharged from the second absorption chamber 120 as the final product. The system may comprise one or more pumps, blowers, or fans to drive gases and solutions within the system. The system may further comprise one or more tanks for holding gases or solutions, for example, product tanks for holding liquid product and/or product comprising solids.

The function and advantages of these and other embodiments will be more fully understood from the following non-limiting example. The example is intended to be illustrative in nature and is not to be considered to be limiting to the scope of the embodiments discussed herein.

EXAMPLE

Concentrated Nitrogen Product from Manure Flue Gas

A pilot test was run for a nitrogen recovery process from a nitrogen containing gas stream. The results were estimated based on the pilot test. Water and nitrogen concentrations of each gas and liquid solution are presented in Table 1.

Flue gases from a manure dryer carrying 105 tons per day (tpd) of water vapor and 3.7 tpd of ammonia nitrogen were put in contact with 16,547 gallons per day (gpd) of liquid in an ammonia recovery process. The ammonia recovery process included a pre-concentration reverse osmosis unit, which was run to produce 43 tpd of water (equivalent to 10,300 gpd) of a pre-concentrated liquid product. In the gas-liquid absorption chamber, the pre-concentrated liquid product was evaporated, obtaining a final concentrated product of 6,247 gpd.

The evaporated water was transported by the flue gases exiting the gas-liquid absorption chamber into the ammonia recovery process. There, the majority of the ammonia was recovered and incorporated into a dilute liquid product to be concentrated.

The system provides the advantage of further concentrating a liquid product using existing heat that otherwise would be lost. The concentrated product of only 6,247 gpd of liquid is easier to store and transport than the 16,547 gpd of dilute liquid product or even the 10,300 gpd of reverse osmosis pre-concentrated liquid product.

TABLE 1

Water and nitrogen concentrations in process gases and liquids.

| Process gas or liquid | Water (tons per day) | Water (gallons per day) | Nitrogen (tons per day) |
| --- | --- | --- | --- |
| Flue gases (1) | 105 | — | 3.7 |
| Flue gases (2) | 148 | — | 3.7 |
| Scrubbed gases (3) | 21 | — | 0.07 |
| Effluent (5) | 730 | 175,000 | 3.6 |
| Dilute product (6) | 661 | 158,453 | 0.07 |
| Pre-concentrated product (7) | 69 | 16,547 | 3.6 |
| Concentrated product (8) | 26 | 6,247 | 3.6 |
| Evaporated water (9) | 10,300 | 43 | 0 |

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method and components thereof, according to the present disclosure, may further comprise a network or systems or be a component of a system for concentrating a substance recovered from a gas stream. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve recovering a concentrated substance from a gas stream. Accordingly the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A method of producing a concentrate solution comprising a contaminant from a gas stream, the method comprising:
   introducing the gas stream comprising the contaminant into an absorption chamber;
   introducing a dilute solution comprising the contaminant into the absorption chamber;
   at least one of the gas stream and the dilute solution being at an elevated temperature;

contacting the gas stream with the dilute solution to produce a liquid-enriched gas, a concentrate solution, and water vapor; and controlling a concentration of the contaminant in the concentrate solution to avoid formation of crystals.

2. The method of claim 1, further comprising introducing the liquid-enriched gas into a scrubbing liquid to produce the dilute solution.

3. The method of claim 1, wherein the elevated temperature is controlled to partially evaporate the dilute solution upon contact with the gas stream.

4. The method of claim 3, wherein the elevated temperature is controlled to reach adiabatic saturation of the gas stream upon contact with the dilute solution.

5. The method of claim 4, further comprising adding heat to the gas stream or to the dilute solution.

6. The method of claim 1, further comprising collecting the concentrate solution.

7. The method of claim 6, wherein the concentrate solution comprises at least one of nitrogen, sulfur, and carbon.

8. The method of claim 1, further comprising drying organic material to produce the gas stream.

9. The method of claim 1, further comprising pre-treating the gas stream to remove solid particles.

10. The method of claim 1, further comprising introducing a non-water saturated gas into the gas stream.

11. A system for producing a concentrated solution from a gas stream comprising:
    a source of a gas stream comprising a contaminant;
    a source of a dilute solution comprising the contaminant; and
    a first absorption chamber fluidly connected to the source of the gas stream and the source of the dilute solution, and having an outlet for a concentrated solution and an outlet for a liquid-enriched gas,
    the source of the dilute solution comprising a subsystem for removing contaminants from the gas stream positioned downstream from the first absorption chamber, the subsystem comprising a second absorption chamber having an inlet for receiving at least one of the gas stream and the liquid-enriched gas and an outlet for the dilute solution, the subsystem further comprising a source of an oxidant fluidly connected to the second absorption chamber.

12. The system of claim 11, further comprising a temperature control subsystem configured to maintain a predetermined temperature range within the first absorption chamber.

13. The system of claim 12, wherein the temperature control subsystem comprises a temperature sensor.

14. The system of claim 13, wherein the temperature control subsystem comprises a control module electrically connected to the temperature sensor and configured to adjust a temperature within the first absorption chamber responsive to a measurement obtained by the temperature sensor.

15. The system of claim 12, wherein the temperature control subsystem comprises a heat exchanger.

16. The system of claim 11, wherein the subsystem for removing contaminants from the gas stream further comprises a pre-concentration unit positioned downstream from the second absorption chamber.

17. The system of claim 16, wherein the pre concentrating pre-concentration unit comprises at least one of an ultrafiltration unit, a reverse osmosis unit, and an electrodialysis unit.

18. The system of claim 17, wherein the pre concentrating pre-concentration unit comprises at least two of an ultrafiltration unit, a reverse osmosis unit, and an electrodialysis unit.

19. The system of claim 11, further comprising a solids-liquid separation unit positioned downstream from the first absorption chamber through the outlet for the concentrated solution.

20. The system of claim 19, wherein the solids-liquid separation unit comprises at least one of a sedimentation unit and a filtration unit.

21. The system of claim 11, further comprising a gas-solids separation unit positioned downstream from the source of the gas stream.

22. The system of claim 21, wherein the gas-solids separation unit comprises at least one of a cyclone unit and a bag filtration unit.

23. The system of claim 11, wherein the source of the gas stream comprises an organic material dryer.

24. The system of claim 11, further comprising a source of a non-water saturated gas fluidly connected to the source of the gas stream.

25. The system of claim 11, wherein the subsystem for removing contaminants from the gas stream further comprises a microbiological treatment subsystem fluidly connected to the second absorption chamber.

26. The system of claim 11, wherein the subsystem for removing contaminants from the gas stream further comprises a source of a base fluidly connected to the second absorption chamber.

27. The system of claim 11, wherein the subsystem for removing contaminants from the gas stream further comprises a pH control subsystem configured to maintain a predetermined pH within the second absorption chamber.

28. The system of claim 11, wherein the subsystem for removing contaminants from the gas stream further comprises a conductivity control subsystem configured to maintain a predetermined conductivity within the second absorption chamber.

* * * * *